(12) United States Patent
Gou et al.

(10) Patent No.: US 12,120,679 B2
(45) Date of Patent: Oct. 15, 2024

(54) INFORMATION COUNTING METHOD AND APPARATUS, BASE STATION, AND COMPUTER STORAGE MEDIUM

(71) Applicant: ZTE CORPORATION, Guangdong (CN)

(72) Inventors: Wei Gou, Guangdong (CN); Peng Hao, Guangdong (CN); Xingguang Wei, Guangdong (CN); Jing Shi, Guangdong (CN)

(73) Assignee: ZTE Corporation, Shenzhen (CN)

( * ) Notice: Subject to any disclaimer, the term of this patent is extended or adjusted under 35 U.S.C. 154(b) by 389 days.

(21) Appl. No.: 17/632,282

(22) PCT Filed: Jul. 20, 2020

(86) PCT No.: PCT/CN2020/103002
§ 371 (c)(1),
(2) Date: Feb. 2, 2022

(87) PCT Pub. No.: WO2021/022998
PCT Pub. Date: Feb. 11, 2021

(65) Prior Publication Data
US 2022/0272733 A1   Aug. 25, 2022

(30) Foreign Application Priority Data
Aug. 2, 2019   (CN) .......................... 201910723383.8

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1812* (2013.01); *H04L 5/0053* (2013.01);
(Continued)

(58) Field of Classification Search
CPC ......... H04W 72/1263; H04W 72/1273; H04W 72/12; H04W 72/1278; H04W 72/04;
(Continued)

(56) References Cited

U.S. PATENT DOCUMENTS 11,258,544 B2    2/2022   Wang et al.
11,777,662 B2 *  10/2023  Wang .................... H04L 1/1861
                                                          370/329
(Continued)

FOREIGN PATENT DOCUMENTS

CN    107370570 A    11/2017
CN    107409016 A    11/2017
(Continued)

OTHER PUBLICATIONS

NTT DOCOMO, Inc. "Remaining issues on HARQ-ACK codebook and CA" 3GPP TSG RAN WG1 Meeting #92bis R1-1805059, Sanya, China, Apr. 16-20, 2018.
(Continued)

*Primary Examiner* — Warner Wong
(74) *Attorney, Agent, or Firm* — Foley & Lardner LLP

(57) ABSTRACT

Disclosed in the present application are an information counting method, an information counting apparatus, a base station, and a computer storage medium. The information counting method includes: determining multiple PDCCHs which are transmitted within one MO of a serving cell and used for scheduling multiple PDSCHs, where HARQ-ACKs of the multiple PDSCHs are transmitted in one HARQ-ACK codebook; and determining, according to an order of indexes of serving cells to which the multiple PDSCHs belong, an order of values assigned to DAI counter fields in the multiple PDCCHs corresponding to the multiple PDSCHs.

12 Claims, 7 Drawing Sheets

```
Determine multiple PDCCHs which are transmitted within one MO of a serving     S3010
cell and used for scheduling multiple PDSCHs, where HARQ-ACKs of the
multiple PDSCHs are transmitted in one HARQ-ACK codebook

↓

Determine, according to an order of indexes of serving cells to which the multiple   S3020
PDSCHs belong, an order of values assigned to DAI counter fields in the
PDCCHs corresponding to the multiple PDSCHs

↓

For PDCCHs that schedule PDSCHs in a same serving cell, determine, according
to an order of indexes of CORESETs to which the PDCCHs belong, an order of    S3030
values assigned to DAI counter fields in the PDCCHs that schedule the PDSCHs
in the same serving cell
```

(51) Int. Cl.
*H04L 5/00* (2006.01)
*H04W 24/08* (2009.01)
*H04W 72/0446* (2023.01)
*H04W 72/20* (2023.01)

(52) U.S. Cl.
CPC ....... *H04W 24/08* (2013.01); *H04W 72/0446* (2013.01); *H04W 72/20* (2023.01)

(58) Field of Classification Search
CPC ........... H04W 72/044; H04W 72/0446; H04W 24/00; H04W 24/08; H04L 1/18; H04L 1/1812; H04L 5/003; H04L 5/0053; H04L 5/0055; H04L 1/1825; H04L 1/1864; H04L 1/1867; H04L 1/1896; H04L 1/0053; H04L 1/0055; H04L 1/0058
See application file for complete search history.

(56) References Cited

U.S. PATENT DOCUMENTS

| | | | | |
|---|---|---|---|---|
| 2012/0320805 | A1* | 12/2012 | Yang | H04L 5/0053 370/280 |
| 2014/0105076 | A1* | 4/2014 | Yang | H04J 3/1694 370/280 |
| 2014/0192688 | A1* | 7/2014 | Yang | H04L 5/0055 370/280 |
| 2015/0016315 | A1* | 1/2015 | Yang | H04L 1/1861 370/280 |
| 2017/0164354 | A1 | 6/2017 | Yang et al. | |
| 2018/0019842 | A1* | 1/2018 | Fu | H04W 72/0446 |
| 2018/0132265 | A1* | 5/2018 | Guan | H04W 72/542 |
| 2018/0145796 | A1* | 5/2018 | Liang | H04L 1/1861 |
| 2018/0278373 | A1* | 9/2018 | Wang | H04L 5/0055 |
| 2019/0045489 | A1* | 2/2019 | He | H04W 72/044 |
| 2019/0103943 | A1 | 4/2019 | Wang et al. | |
| 2019/0109692 | A1* | 4/2019 | Gao | H04L 1/1861 |
| 2021/0075558 | A1* | 3/2021 | Takeda | H04W 72/23 |
| 2021/0094485 | A1* | 4/2021 | Fuchigami | B60R 16/0215 |
| 2021/0176011 | A1* | 6/2021 | Lei | H04L 1/1896 |
| 2021/0306987 | A1* | 9/2021 | Takeda | H04W 72/02 |
| 2021/0352704 | A1* | 11/2021 | Yang | H04L 1/1671 |
| 2022/0014317 | A1* | 1/2022 | Wu | H04W 72/23 |
| 2022/0029750 | A1* | 1/2022 | Matsumura | H04W 72/0446 |
| 2022/0104231 | A1* | 3/2022 | Gou | H04W 72/1273 |
| 2022/0239445 | A1* | 7/2022 | Yoshioka | H04L 5/0055 |
| 2022/0248448 | A1* | 8/2022 | Lin | H04L 1/1896 |
| 2022/0264614 | A1* | 8/2022 | Yu | H04W 72/1273 |
| 2022/0321303 | A1* | 10/2022 | Matsumura | H04L 5/0053 |
| 2023/0106098 | A1* | 4/2023 | Wang | H04W 72/21 370/329 |

FOREIGN PATENT DOCUMENTS

| | | | | |
|---|---|---|---|---|
| CN | 109586877 | A | | 4/2019 |
| CN | 110535573 | A | | 12/2019 |
| KR | 20160093532 | A | * | 11/2015 ............... H04L 1/18 |
| KR | 20160093532 | | * | 8/2016 ............... H04L 1/18 |
| WO | WO-2017/110954 | A1 | | 6/2017 |
| WO | 2017160350 | A1 | | 9/2017 |
| WO | WO-2019/047743 | A1 | | 3/2019 |
| WO | WO-2019/104481 | A1 | | 6/2019 |
| WO | WO-2020042528 | A1 | * | 3/2020 ............ H04L 1/1607 |

OTHER PUBLICATIONS

LG Electronics, "Correction on CA and BWP operation for NR" 3GPP TSG RAN WG1 Meeting #94-R1-1808493—Gothenburg, Sweden, Aug. 20-24, 2018.

International Search Report for the International Patent Application No. PCT/CN2020/103002, mailed Oct. 22, 2020, 2 pages.

Notice of Reasons for Rejection on JP 2022-506628 dated Aug. 14, 2023 (with English translation, 13 pages).

First Office Action for TW App. No. 109125850 dated Nov. 13, 2023 (with English machine translation, 8 pages).

First Office Action for JP Appl. No. 2022-506628, dated Jan. 13, 2023 (with English translation, 20 pages).

Huawei et al., "Corrections on bandwidth part and CA", 3GPP TSG RAN WG1 Meeting #94bis, R1-1810112, Oct. 12, 2018, Chengdu, China (16 pages).

Intel Corporation, "Support of different numerologies for carrier aggregation" 3GPP TSG-RAN WG1 Meeting #AH 1801, R1-1800338, Jan. 26, 2018, Vancouver, Canada (8 pages).

Extended European Search Report for EP Appl. No. 20849725.5, dated Aug. 4, 2023 (9 pages).

Huawei et al., "Remaining issues on NR CA", 3GPP TSG RAN WG1 Meeting #93, R1-1805895, May 25, 2018, Busan, Korea (9 pages).

* cited by examiner

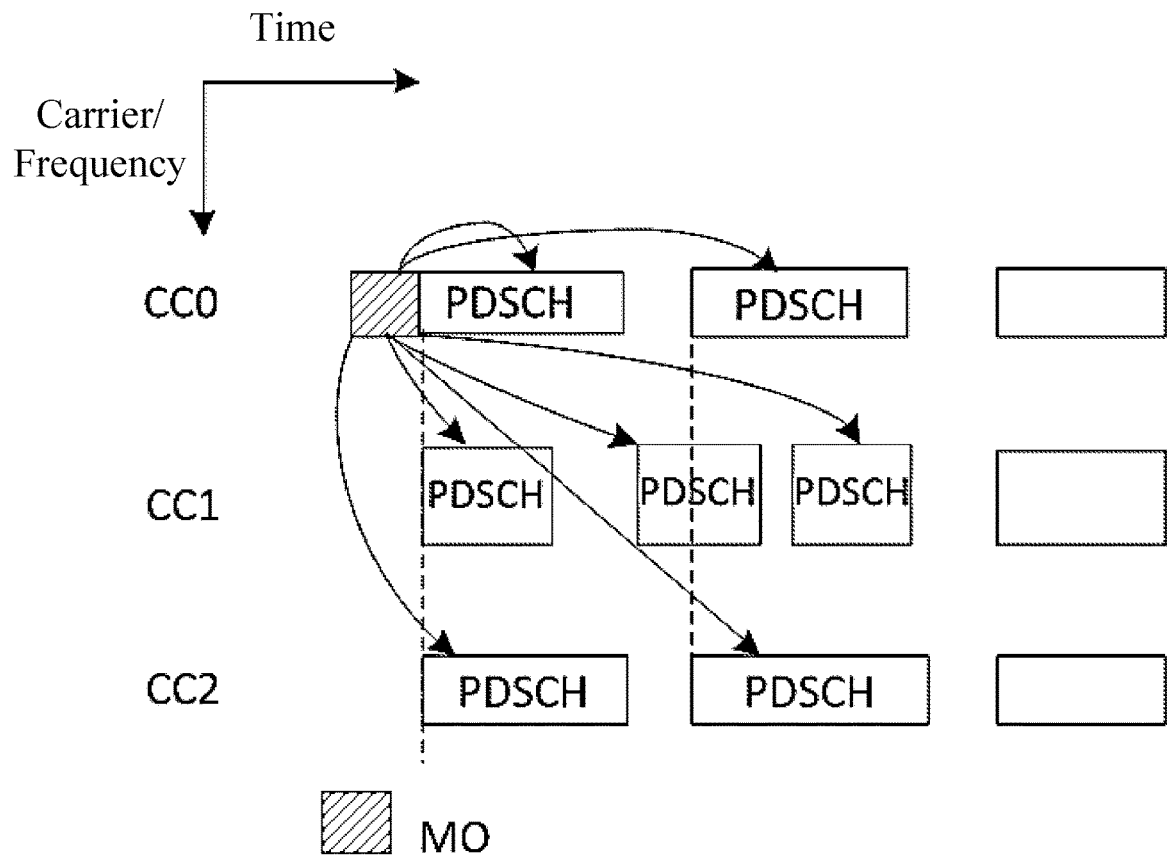

FIG. 1

| Determine multiple PDCCHs which are transmitted within one MO of a serving cell and used for scheduling multiple PDSCHs, where HARQ-ACKs of the multiple PDSCHs are transmitted in one HARQ-ACK codebook | S2010 |

↓

| Determine, according to an order of indexes of serving cells to which the multiple PDSCHs belong, an order of values assigned to DAI counter fields in the PDCCHs corresponding to the multiple PDSCHs | S2020 |

FIG. 2

INFORMATION COUNTING METHOD AND APPARATUS, BASE STATION, AND COMPUTER STORAGE MEDIUM

CROSS-REFERENCE TO RELATED APPLICATION(S)

This is a national stage application filed under 37 U.S.C. 371 based on International Patent Application No. PCT/CN2020/103002, filed Jul. 20, 2020, which claims priority to Chinese Patent Application No. 201910723383.8 filed Aug. 2, 2019, the disclosures of both of which are incorporated herein by reference in their entireties.

TECHNICAL FIELD

The present application relates to the field of wireless communication networks, for example, to an information counting method, an information counting apparatus, a base station and a computer storage medium.

BACKGROUND

In the new radio (NR) system of $5^{th}$ generation mobile communication (5G), different subcarrier spacings (SCS) are introduced, for example, the SCSs that can be supported include 15 kHz, 30 kHz, 60 kHz, 120 kHz and 240 kHz. Carriers with these different SCSs, when being aggregated into a carrier aggregation (CA), may cause that within one transmission occasion of physical downlink control channel (PDCCH) of one component carrier (CC) in multiple carriers aggregated, multiple PDCCHs may be transmitted to schedule multiple time slots (slot) in multiple CCs. Whereas in the NR system, it is also allowed to schedule and transmit physical downlink shared channels (PDSCH) according to a certain number of symbol-level granularity within one slot, which causes that multiple PDSCHs are transmitted and scheduled within one slot.

When in one CC of CA, multiple PDCCHs are transmitted within one PDCCH monitoring occasion (MO), and the multiple PDCCHs respectively schedule PDSCHs in multiple CC, thus, in a case of hybrid automatic repeat request acknowledge (HARQ-ACK) codebook being dynamic, and if HARQ-ACKs of PDSCHs scheduled by the multiple PDCCHs transmitted within this MO are in one HARQ-ACK codebook, it is a problem to be addressed how to assign values to the counter downlink assignment indicator (DAI counter) fields in PDCCHs within this MO.

SUMMARY

An information counting method, an information counting apparatus, a base station, and a computer storage medium are provided according to the present application, which addresses a problem of determining an order of values of HARQ-ACKs in a case where multiple PDCCHs used for scheduling multiple PDSCHs are transmitted within one MO and HARQ-ACKs of the multiple PDSCHs are transmitted in one HARQ-ACK codebook, and provides support for transmission of the HARQ-ACKs.

Embodiments of the present application provide an information counting method, which includes:
determining multiple PDCCHs which are transmitted within one MO of a serving cell and used for scheduling multiple PDSCHs, where HARQ-ACKs of the multiple PDSCHs are transmitted in one HARQ-ACK codebook; and
determining, according to an order of indexes of serving cells to which the multiple PDSCHs belong, an order of values assigned to DAI counter fields in the multiple PDCCHs corresponding to the multiple PDSCHs.

Embodiments of the present application provide an information counting apparatus, which includes: a determination module and a value assigning module.

The determination module is configured to determine multiple PDCCHs which are transmitted within one MO of a serving cell and used for scheduling multiple PDSCHs, where HARQ-ACKs of the multiple PDSCHs are transmitted in one HARQ-ACK codebook.

The value assigning module is configured to determine, according to an order of indexes of serving cells to which the multiple PDSCHs belong, an order of values assigned to DAI counter fields in the multiple PDCCHs corresponding to the multiple PDSCHs.

Embodiments of the present application further provide a base station, which includes:
one or more processors; and
a storage apparatus, configured to store one or more programs.

The one or more programs, when executed by the one or more processors, cause the one or more processors to implement the information counting method according to any embodiment of the embodiments in the present application.

Embodiments of the present application further provide a computer-readable storage medium storing a computer program. When the computer program is executed by a processor, the information counting method according to any embodiment of the embodiments in the present application is implemented.

BRIEF DESCRIPTION OF DRAWINGS

FIG. 1 is a schematic diagram showing scheduling PDSCHs in multiple CCs within one MO of one CC in a CA;

FIG. 2 shows a flowchart of an information counting method according to an embodiment;

DETAILED DESCRIPTION

Figure 3:
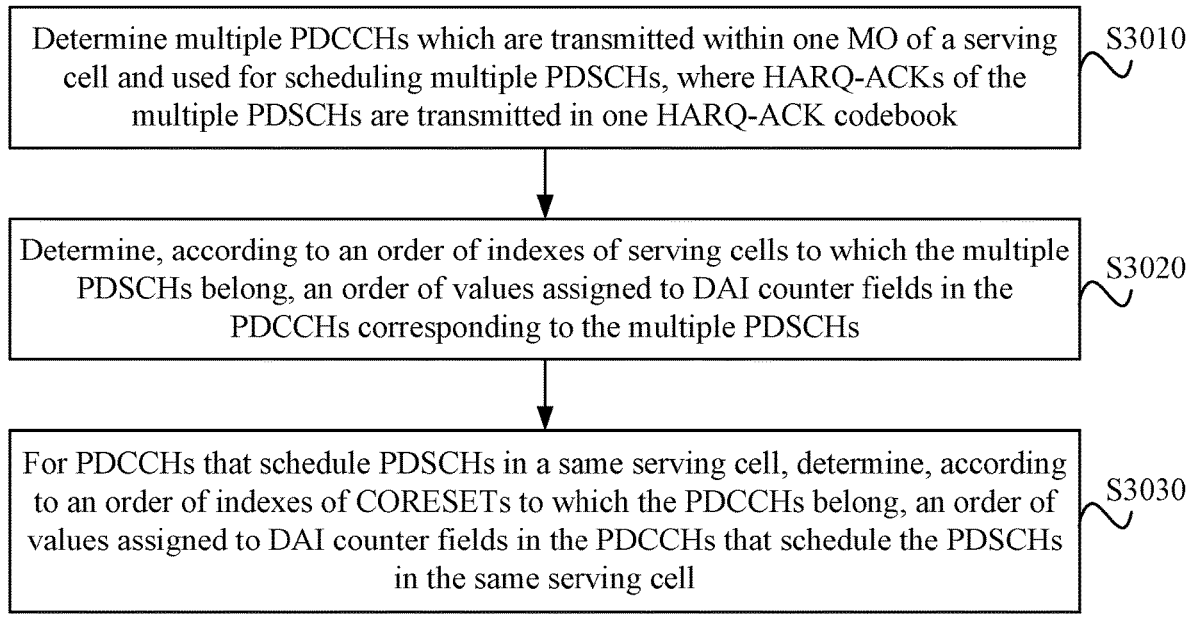
FIG. 3 shows a flowchart of another information counting method according to an embodiment.

Embodiments of the present application are described hereinafter in detail with reference to the accompany drawings.

In a case where a CA is introduced, a carrier aggregation includes multiple CCs, each CC includes same slots in time domain, and one slot includes multiple symbols. In the NR system, it is allowed to schedule and transmit PDSCHs in a certain number of symbol-level granularity within one slot. Then in one CC of CA, the PDCCHs used for scheduling multiple PDSCHs of multiple CCs can be transmitted within one PDCCH MO. As shown in FIG. 1, FIG. 1 is a schematic diagram of scheduling PDSCHs in multiple CCs within one MO of one CC in a CA. The CA shown in FIG. 1 consists of three CCs, respectively, CC0, CC1 and CC2. The SCSs of CC0, CC1 and CC2 may be the same or different. Within one PDCCH MO in CC0, not only PDSCHs in CC0 are scheduled, but also PDSCHs in CC1 and PDSCHs in CC2 are cross-carrier scheduled. The scheduled PDSCHs in one CC may be within one slot or may be in different slots. For example, the three scheduled PDSCHs in CC1 may be in one slot in CC1, or may be in different slots in CC1. In addition, it is also applicable to a case of non-CA, for example, if only one CC exists, it may also transmit multiple PDCCHs within one MO of the CC to schedule multiple PDSCHs to be transmitted in this CC.

In the schematic diagram of PDSCH scheduling shown in FIG. 1, within the MO in CC0, multiple PDCCHs are transmitted, and the multiple PDCCHs schedule multiple PDSCHs in multiple CCs respectively. In this way, in a case of HARQ-ACK dynamic codebook, when HARQ-ACKs of the multiple PDSCHs scheduled by the multiple PDCCHs transmitted within this MO are in one HARQ-ACK codebook, how to assign values to the DAI counter fields in the PDCCHs within this MO, that is, how to determine an order of the multiple PDCCHs within the MO, is an urgent problem to be addressed.

FIG. 2 is a flowchart of an information counting method according to an embodiment. As shown in FIG. 2, the method according to this embodiment includes:

determining (S2010) multiple PDCCHs which are transmitted within one MO of a serving cell and used for scheduling multiple PDSCHs, where HARQ-ACKs of the multiple PDSCHs are transmitted in one HARQ-ACK codebook.

The information counting method according to the embodiment is applied to a base station device, abbreviated as base station, in a wireless communication system. The base station allocates various transmission resources to the base station and a terminal, and transmits various configuring information to the terminals, to allow the base station and the terminal to determine resources used for transmission and various measurement or transmission instructions to be executed. Various messages transmitted from the base station to the terminal is transmitted through downlink channels, and various messages transmitted from the terminal to the base station is transmitted through uplink channels.

The downlink messages transmitted by the base station to the terminals can be divided into two types of information: control information and service information. Generally, the control information is carried in the PDCCHs, and the service information is carried in the PDSCHs. After the downlink service information transmitted by the base station to the terminal through the PDSCHs is received by the terminal, the terminal needs to feed back the HARQ-ACK information to the base station through physical uplink control channels (PUCCH), but the terminal needs to use a certain codebook to feed back the HARQ-ACK information, and the HARQ-ACK codebook used by the terminal needs to be learned by the base station, so that the base station can use the same codebook as that used by the terminal to parse the HARQ-ACK information.

After a CA is introduced, as shown in FIG. 1, in a case where multiple PDCCHs used for scheduling multiple PDSCHs in multiple CCs are transmitted within one MO of one CC in the CA, and HARQ-ACKs of the multiple PDSCHs are transmitted in one HARQ-ACK codebook, since the multiple PDSCHs in the CCs are not transmitted sequentially in time domain, the order of the multiple PDCCHs transmitted within the MO is also not decided, then the base station and the terminal cannot determine the order of the HARQ-ACKs in the HARQ-ACK codebook used and fed back for each of the PDSCHs, which may lead to that the order of the HARQ-ACKs, fed back by the terminal, in the HARQ-ACK codebook used may be inconsistent with the order of the HARQ-ACKs in the HARQ-ACK codebook learned by the base station, and likely affects the feedback of the HARQ-ACKs. In addition, in a case of non-CA, it is also possible that, within one MO of one carrier, PDCCHs of multiple PDSCHs of a current carrier are scheduled and transmitted, and thus, how to determine the order of these PDCCHs is also a problem to be addressed.

One carrier in a case of non-CA or one CC in a case of CA may both be referred to as one serving cell. In embodiments of the present application, a serving cell being one CC in CA is taken as an example for describing a method for assigning values to the DAI counter fields according to the embodiments of the present application.

In a case where the base station determines multiple PDCCHs which are used for scheduling multiple PDSCHs and transmitted within one MO of a serving cell, and HARQ-ACKs of the multiple PDSCHs are transmitted in one HARQ-ACK codebook, a special mechanism is used to sort the multiple PDCCHs transmitted within one MO. The serving cells, to which the multiple PDSCHs scheduled within the MO belong, may have same SCSs or different SCSs, and the multiple PDSCHs scheduled within the MO may be or may not be in one slot.

The method according to this embodiment also includes:

determining (S2020), according to an order of indexes of serving cells to which the multiple PDSCHs belong, an order of values assigned to DAI counter fields in the PDCCHs corresponding to the multiple PDSCHs.

When multiple PDCCHs which are used for scheduling multiple PDSCHs and transmitted within one MO of a serving cell are determined, an order of indexes of serving cells to which the multiple PDSCHs belong may be determined firstly, and then an order of values assigned to the DAI counter fields in the multiple PDCCHs corresponding to the multiple PDSCHs may be determined. For example, an order of values assigned to the DAI counter fields in the multiple PDCCHs corresponding to the multiple PDSCHs may be determined according to an ascending order of the indexes of the serving cells to which the multiple PDSCHs belong, or an order of values assigned to the DAI counter fields in the multiple PDCCHs corresponding to the multiple PDSCHs may be determined according to a descending order of the indexes of the serving cells to which the multiple PDSCHs belong.

For example, in the schematic diagram of PDSCHs scheduling as shown in FIG. 1, if multiple PDCCHs used for scheduling multiple PDSCHs are transmitted within the MO, the values assigned to the DAI counter fields in the multiple PDCCHs corresponding to the multiple PDSCHs may be sorted in ascending order according to indexes of CCs to which the PDSCHs belong, sorting the value of the DAI counter field in the PDCCH corresponding to the PDSCH in the CC0 in the first, the PDCCH corresponding to the PDSCH in the CC1 in the next, and the PDCCH corresponding to the PDSCH in the CC2 further in the next. The values assigned to the DAI counter fields in the multiple PDCCHs corresponding to the multiple PDSCHs may also be sorted in descending order according to the indexes of the CCs to which the PDSCHs belong.

However, when multiple PDSCHs scheduled within the MO belong to one serving cell, and the multiple PDSCHs correspond to a same serving cell index, the base station may sort values of DAI counter fields in the PDCCHs corresponding to the PDSCHs according to a default setting, for example, according to an order of the PDSCHs in time domain. In other embodiments, the base station may determine an order of the values assigned according to any method in the following embodiments.

According to the DAI counter field value assignment method provided in this embodiment, when multiple PDCCHs which are used for scheduling multiple PDSCHs and transmitted within one MO of a serving cell are determined, and HARQ-ACKs of the multiple PDSCHs are transmitted in one HARQ-ACK codebook, the order of values assigned to the DAI counter fields in the multiple PDCCHs corresponding to the multiple PDSCHs may be determined according to the order of indexes of the serving cells to which the multiple PDSCHs belong, thereby addressing the problem of how to perform order determination in a case where multiple PDCCHs used for scheduling multiple PDSCHs are transmitted within one MO and HARQ-ACKs of the multiple PDSCHs are transmitted in one HARQ-ACK codebook, providing support for transmission of the HARQ-ACKs.

FIG. 3 is a flowchart of another information counting method according to an embodiment. As shown in FIG. 3, the method according to this embodiment includes:

determining (S3010) multiple PDCCHs which are transmitted within one MO of a serving cell and used for scheduling multiple PDSCHs, where HARQ-ACKs of the multiple PDSCHs are transmitted in one HARQ-ACK codebook;

determining (S3020), according to an order of indexes of serving cells to which the multiple PDSCHs belong, an order of values assigned to DAI counter fields in the PDCCHs corresponding to the multiple PDSCHs; and for PDCCHs that schedule PDSCHs in a same serving cell, determining (S3030), according to an order of indexes of CORESETs to which the PDCCHs belong, an order of values assigned to DAI counter fields in the PDCCHs that schedule the PDSCHs in the same serving cell.

In embodiments as shown in FIG. 2, when multiple PDCCHs which are used for scheduling multiple PDSCHs and transmitted in one MO of a serving cell are determined, and HARQ-ACKs of the multiple PDSCHs are transmitted in one HARQ-ACK codebook, if multiple PDCCHs for scheduling PDSCHs in a same serving cell are included within the MO, it may further determine an order of values assigned to DAI counter fields in the PDCCHs for scheduling the PDSCHs in the same serving cell according to an order of indexes of control resource sets (CORESET) to which the PDCCHs belong. For example, an order of values assigned to the DAI counter fields in the PDCCHs scheduling the PDSCHs in the same serving cell may be determined according to an ascending order of the indexes of the CORESETs to which the PDCCHs belong, and an order of values assigned to the DAI counter fields in the PDCCHs scheduling the PDSCHs in the same serving cell may also be determined according to a descending order of the indexes of the CORESETs to which the PDCCHs belong.

The method according to this embodiment may also include, for PDCCHs that schedule PDSCHs in a same serving cell and correspond to a same CORSET index, determining (S3040), according to an order of indexes of minimum CCEs to which the PDCCHs belong, an order of values assigned to DAI counter fields in the PDCCHs that schedule the PDSCHs in the same serving cell and correspond to the same CORSET index.

In S3030, if multiple PDCCHs that schedule PDSCHs in a same serving cell still correspond to a same CORSET index, it may further determine, according to an order of indexes of minimum control channel elements (CCE) to which the PDCCHs belong, an order of values assigned to DAI counter fields in the PDCCHs that schedule the PDSCHs in the same serving cell and correspond to the same CORSET index. For example, an order of values assigned to the DAI counter fields in the PDCCHs that schedule the PDSCHs in the same serving cell and correspond to the same CORSET index may be determined according to an ascending order of the indexes of the minimum CCEs to which the PDCCHs belong, and an order of values assigned to the DAI counter fields in the PDCCHs that schedule the PDSCHs in the same serving cell and correspond to the same CORSET index may also be determined according to a descending order of the indexes of the minimum CCEs to which the PDCCHs belong.

In this embodiment, whether to execute S3030 and S3040 may be determined according to a practical order determination result. For example, if the order of values assigned to DAI counter fields in multiple PDCCHs corresponding to multiple PDSCHs can be determined after S3020, then S3030 and S3040 do not need to be executed; if the order of the values assigned to the DAI counter fields in the multiple PDCCHs corresponding to the multiple PDSCHs can be determined after S3020 and S3030, then S3040 does not need to be executed; otherwise, it S3040 also need to be executed.

Figure 4:
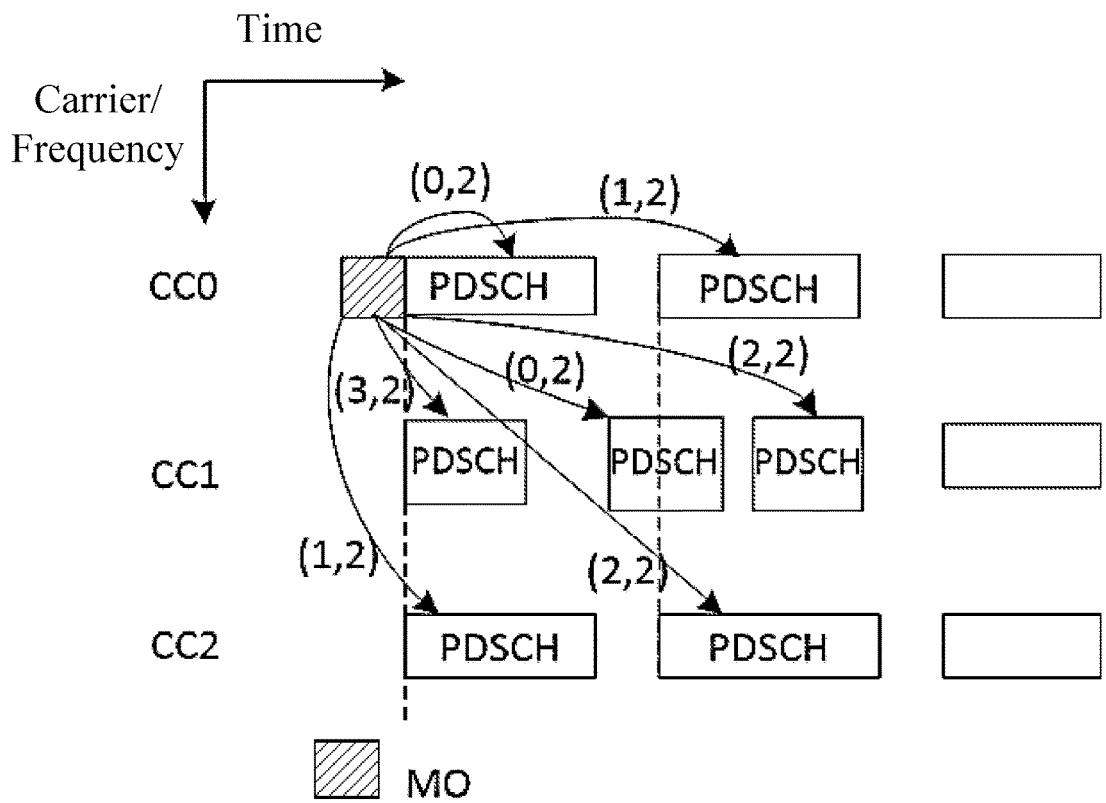
FIG. 4 is a schematic diagram of an information counting scenario according to an embodiment.

The information counting method shown in FIG. 3 is described hereinafter with an specific embodiment. FIG. 4 is a schematic diagram of an information counting scenario according to an embodiment. Similar with FIG. 1, three carriers (respectively denoted as CC0, CC1 and CC2, where the carrier is an equivalent concept to a cell and a serving cell) are configured and activated for the user equipment (UE), and multiple PDCCHs are transmitted within one MO of the CC0, for scheduling PDSCHs in the CC0, CC1 and CC2 respectively. Specifically, two PDSCHs are scheduled for CC0, three PDSCHs are scheduled for CC1, and two PDSCHs are scheduled for CC2. In addition, HARQ-ACK information corresponding to these PDSCHs are indicated to be transmitted in one HARQ-ACK codebook, or HARQ-ACK information corresponding to these PDSCHs and HARQ-ACK information corresponding to PDSCHs scheduled by PDCCHs within other MOs are indicated to be transmitted in one HARQ-ACK codebook. In FIG. 4, CC0, CC1 and CC2 may have same SCSs or different SCSs, and the PDSCHs scheduled within this MO in these CCs may be in one slot or in different slots, which is not limited herein. In this case, the value assignment to DAI counter fields in these PDCCHs can be processed in the following manner, that is, when multiple PDCCHs are transmitted within one MO to respectively schedule one or more PDSCHs in one or more CCs, the value assignment to the DAI counter fields in the PDCCHs within this MO is processed as follows.

An order of values assigned to DAI counter fields in the PDCCHs within this MO is determined according to an ascending order (or descending order, as long as it is negotiated in advance) of indexes of the CCs to which the PDSCHs scheduled by the PDCCHs belong; for PDCCHs that schedule PDSCHs in a same CC, an order of values assigned to DAI counter fields in the PDCCHs within this MO is further determined according to an ascending order (or descending order, as long as it is negotiated in advance) of indexes of CORSETs to which the PDCCHs belong, and then further according to an ascending order (or descending order, as long as it is negotiated in advance) of indexes of minimum CCEs to which the PDCCHs belong. It is assumed herein that the PDCCHs scheduling the two PDSCHs in the CC0 correspond to a same CORSET_2 (denoting a CORSET with an index as 2), and minimum CCEs with indexes as 0 and 5 respectively (assuming that the corresponding PDSCH whose time is earlier corresponds to a minimum CCE with a smaller index, and others likewise). The PDCCHs for scheduling the first two PDSCHs in the CC1 belongs to the same CORSET_2, and minimum CCEs with indexes as 3 and 7 respectively (assuming that the corresponding PDSCH whose time is earlier corresponds to a minimum CCE with a smaller index, and others likewise). The PDCCH for scheduling a third PDSCH in the CC1 corresponds to CORSET_1, and a minimum CCE with an index as 10. The PDCCHs for scheduling the two PDSCHs in the CC2 correspond to a same CORSET_3, and minimum CCEs with indexes as 12 and 14 respectively (assuming that the corresponding PDSCH whose time is earlier corresponds to a minimum CCE with a smaller index, and others likewise). Thus, the finally obtained DAI counter values are as shown in FIG. 4, for example, a first bit in (0, 2) represents a DAI counter, a second bit in (0, 2) represents a DAI total (i.e. a total number of DAIs). The first bit and the second bit each is counted from 0, i.e. 0 represents a first one, and others likewise. Herein, values assigned to either the DAI total or the DAI counter are from 0 to 3 in turn and in circulation, e.g., 0, 1, 2, 3, 0, 1, 2, 3, 0 The value assignment order of DAI counter shown in FIG. 4 in turn is: the first PDSCH in CC0, the second PDSCH in CC0, the third PDSCH in CC1, the first PDSCH in CC1, the second PDSCH in CC1, the first PDSCH in CC2, and the second PDSCH in CC2. The value of DAI counter corresponding to the PDCCH for scheduling the second PDSCH in the CC1 is 0, which actually represents the fifth one.

Figure 5:
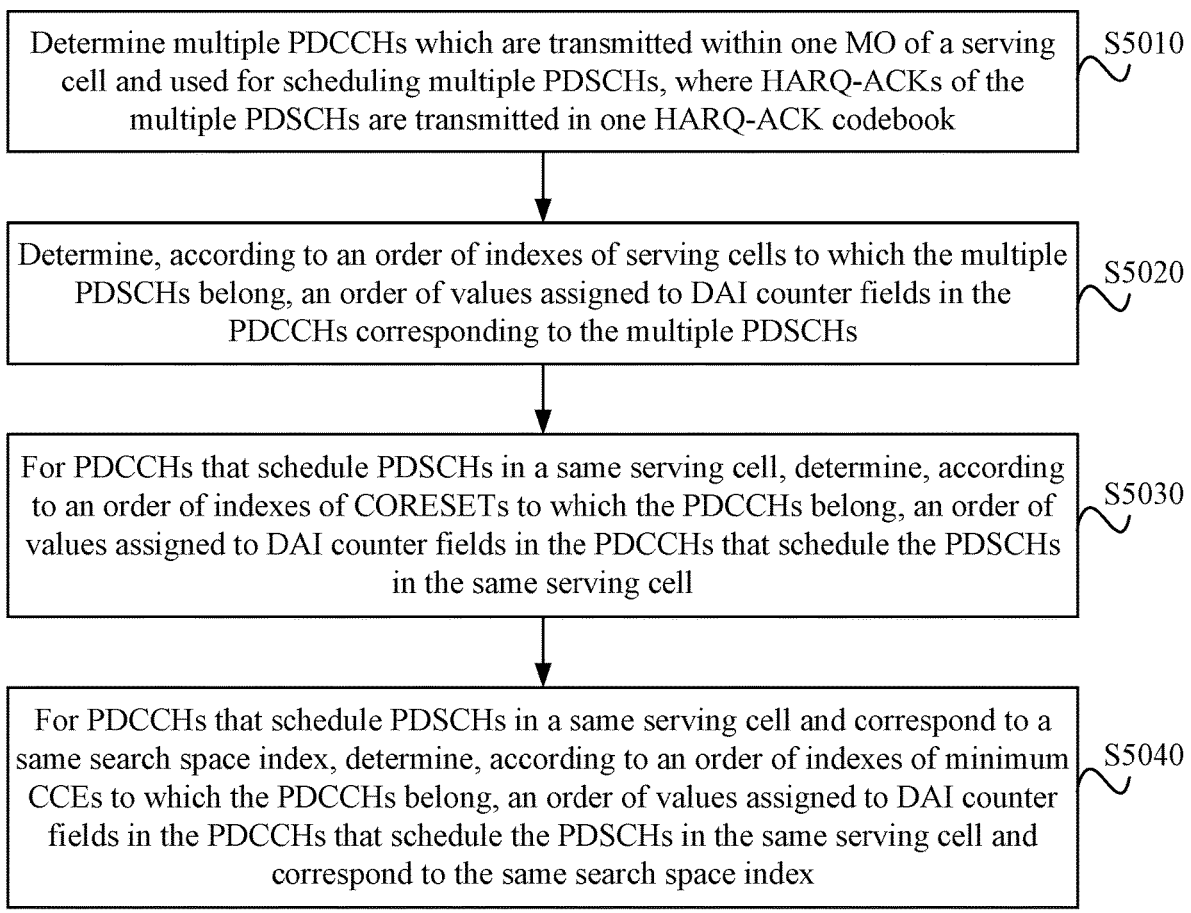
FIG. 5 is a flowchart of another information counting method according to an embodiment.

FIG. 5 is a flowchart of another information counting method according to an embodiment. As shown in FIG. 5, the method according to this embodiment includes:

determining (S5010) multiple PDCCHs which are transmitted within one MO of a serving cell and used for scheduling multiple PDSCHs, where HARQ-ACKs of the multiple PDSCHs are transmitted in one HARQ-ACK codebook;

determining (S5020), according to an order of indexes of serving cells to which the multiple PDSCHs belong, an order of values assigned to DAI counter fields in the PDCCHs corresponding to the multiple PDSCHs; and for PDCCHs that schedule PDSCHs in a same serving cell, determining (S5030), according to an order of indexes of search spaces to which the PDCCHs belong, an order of values assigned to DAI counter fields in the PDCCHs that schedule the PDSCHs in the same serving cell.

In an embodiment shown in FIG. 2, when multiple PDCCHs which are used for scheduling multiple PDSCHs and transmitted in one MO of a serving cell are determined, and HARQ-ACKs of the multiple PDSCHs being transmitted in one HARQ-ACK codebook, if multiple PDCCHs for scheduling PDSCHs in a same serving cell are included within the MO, it may further determine an order of values assigned to DAI counter fields in the PDCCHs for scheduling the PDSCHs in the same serving cell according to an order of indexes of search spaces to which the PDCCHs belong. For example, an order of values assigned to the DAI counter fields in the PDCCHs scheduling the PDSCHs in the same serving cell may be determined according to an ascending order of the indexes of the search spaces to which the PDCCHs belong, and an order of values assigned to the DAI counter fields in the PDCCHs scheduling the PDSCHs in the same serving cell may also be determined according to a descending order of the indexes of the search spaces to which the PDCCHs belong.

The method according to this embodiment may further include, for PDCCHs that schedule PDSCHs in a same serving cell and correspond to a same search space index, determining (S5040), according to an order of indexes of minimum CCEs to which the PDCCHs belong, an order of values assigned to DAI counter fields in the PDCCHs that schedule the PDSCHs in the same serving cell and correspond to the same search space index.

If in S5030, multiple PDCCHs that schedule PDSCHs in a same serving cell still correspond to a same search space index, then for these PDCCHs, it may further determine, according to an order of indexes of minimum CCEs to which the PDCCHs belong, an order of values assigned to DAI counter fields in the PDCCHs that schedule the PDSCHs in the same serving cell and correspond to the same search space index. For example, an order of values assigned to the DAI counter fields in the PDCCHs that schedule the PDSCHs in the same serving cell and correspond to the same search space index may be determined according to an ascending order of the indexes of the minimum CCEs to which the PDCCHs belong, and an order of values assigned to the DAI counter fields in the PDCCHs that schedule PDSCHs in the same serving cell and correspond to the same search space index may be determined according to a descending order of the indexes of the minimum CCEs to which the PDCCHs belong.

In this embodiment, whether to execute S5030 and S5040 may be determined according to a practical order determination result. For example, if the order of values assigned to DAI counter fields in multiple PDCCHs corresponding to multiple PDSCHs can be determined after execution of S5020, then S5030 and S5040 do not need to be executed; if the order of the values assigned to the DAI counter fields in the multiple PDCCHs corresponding to the multiple PDSCHs can be determined after execution of S5020 and S5030, then S5040 does not need to be executed; otherwise, it needs to continue to execute S5040. This embodiment is different from the embodiment shown in FIG. 3 only in that, after the order of values of DAI counter fields in multiple PDCCHs corresponding to multiple PDSCHs are determined according to an order of indexes of serving cells to which the multiple PDSCHs belong, for PDCCHs that schedule PDSCHs in a same serving cell, order of values of DAI counter fields in the multiple PDCCHs corresponding to the multiple PDSCHs are determined according to an order of indexes of CORESETs to which the PDCCHs belong or according to an order of indexes of search spaces to which the PDCCHs belong.

It is assumed that the PDCCHs scheduling the two PDSCHs in the CC0 correspond to a same search space_2 (indicating a search space with an index as 2), and minimum CCEs with indexes as 0 and 5 respectively (assuming that the corresponding PDSCH whose time is earlier, corresponds to a minimum CCE with a smaller index, and others likewise). The PDCCHs for scheduling the first two PDSCHs in the CC1 correspond to the same search space_2, and minimum CCEs with indexes as 3 and 7 respectively (assuming that the corresponding PDSCH whose time is earlier, corresponds to a minimum CCE with a smaller index, and others likewise). The PDCCH for scheduling a third PDSCH in the CC1 corresponds to search space_1, and the minimum CCE with an index as 10. The PDCCHs for scheduling the two PDSCHs in the CC2 correspond to a same search space_3, and minimum CCEs with indexes as 12 and 14 respectively (assuming that the corresponding PDSCH whose time is earlier, corresponds to a minimum CCE with a smaller index, and others likewise). Thus, the finally obtained DAI counter values are also as shown in FIG. 4.

Figure 6:
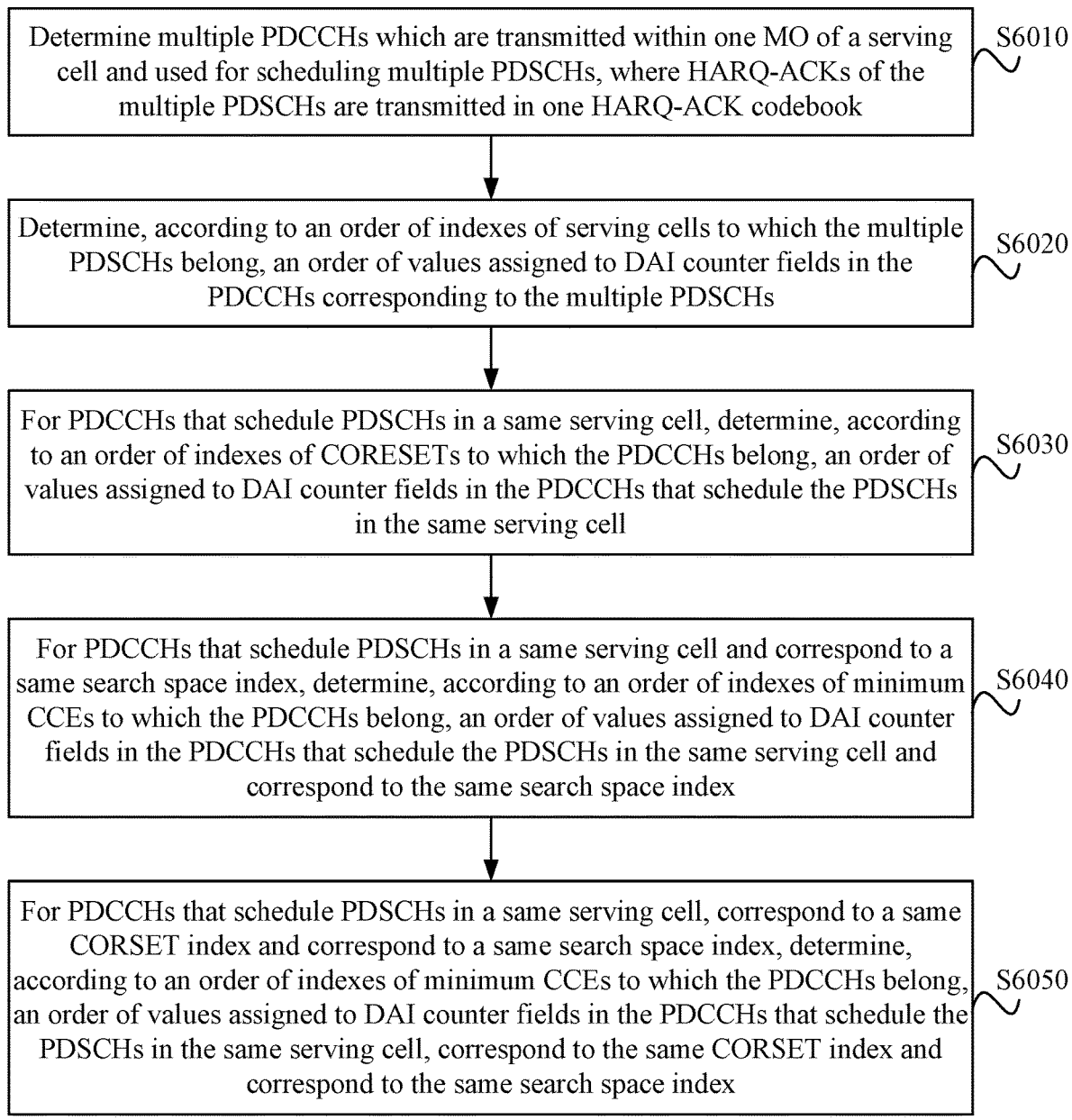
FIG. 6 is a flowchart of another information counting method according to an embodiment.

FIG. 6 is a flowchart of another information counting method according to an embodiment. As shown in FIG. 6, the method according to this embodiment includes:

determining (S6010) multiple PDCCHs which are transmitted within one MO of a serving cell and used for scheduling multiple PDSCHs, where HARQ-ACKs of the multiple PDSCHs are transmitted in one HARQ-ACK codebook;

determining (S6020), according to an order of indexes of serving cells to which the multiple PDSCHs belong, an order of values assigned to DAI counter fields in the PDCCHs corresponding to the multiple PDSCHs;

for PDCCHs that schedule PDSCHs in a same serving cell, determining (S6030), according to an order of indexes of CORESETs to which the PDCCHs belong, an order of values assigned to DAI counter fields in the PDCCHs that schedule the PDSCHs in the same serving cell;

for PDCCHs that schedule PDSCHs in a same serving cell and correspond to a same CORSET index, determining (S6040), according to an order of indexes of search spaces to which the PDCCHs belong, an order of values assigned to DAI counter fields in the PDCCHs that schedule the PDSCHs in the same serving cell and correspond to the same CORSET index; and for PDCCHs that schedule PDSCHs in a same serving cell and correspond to a same CORSET index and correspond to a same search space index, determining (S6050), according to an order of indexes of minimum CCEs to which the PDCCHs belong, an order of values assigned to DAI counter fields in the PDCCHs that schedule the PDSCHs in the same serving cell, correspond to the same CORSET index and correspond to the same search space index.

In this embodiment, when multiple PDCCHs which are used for scheduling multiple PDSCHs and transmitted in one MO of a serving cell are determined, and HARQ-ACKs of the multiple PDSCHs being transmitted in one HARQ-ACK codebook, if multiple PDCCHs for scheduling PDSCHs in a same serving cell are included within the MO, it may further determine an order of values assigned to DAI counter fields in the PDCCHs for scheduling the PDSCHs in the same serving cell according to an order of indexes of CORESETs to which the PDCCHs belong. However, in a case where PDCCHs that schedule PDSCHs in a same serving cell still correspond to a same CORESET index, for the PDCCHs that schedule PDSCHs in a same serving cell and correspond to a same CORSET index, an order of values assigned to DAI counter fields in the PDCCHs that schedule the PDSCHs in the same serving cell and correspond to the same CORSET index may be determined according to an order of indexes of search spaces to which the PDCCHs belong. In a case where PDCCHs that schedule PDSCHs in a same serving cell and corresponding to a same CORESET index still correspond to a same search space index, an order of values assigned to DAI counter fields in the PDCCHs that schedule PDSCHs in the same serving cell, correspond to the same CORSET index and correspond to the same search space index may be determined according to an order of indexes of minimum CCEs to which the PDCCHs belong.

The S6030 is similar to the S3030, the S6040 is similar to the S5030, the S6050 is similar to the S3040 and the S5040, which are not described in detail herein. In this embodiment, whether to execute the S6030 to the S6050 may be determined according to a practical order determination result. For example, if the order of values assigned to DAI counter fields in multiple PDCCHs corresponding to multiple PDSCHs can be determined after execution of the S6020, then the S6030 to S6050 do not need to be executed; if the order of the values assigned to the DAI counter fields in the multiple PDCCHs corresponding to the multiple PDSCHs can be determined after execution of the S6020 and S6030, then the S6040 and the 6050 do not need to be executed; otherwise, it needs to continue to execute the S5040 and the S6050; and if the order of the values assigned to the DAI counter fields in the multiple PDCCHs corresponding to the multiple PDSCHs can be determined after execution of the S6040, then the 6050 does not need to be executed; otherwise, it needs to continue to execute the S6050.

In an embodiment, the execution order of S6030 and S6040 in the embodiment shown in FIG. 6 may also be inversed, and thus, the information counting method may include: determining multiple PDCCHs which are transmitted within one MO of a serving cell and used for scheduling multiple PDSCHs, where HARQ-ACKs of the multiple PDSCHs are transmitted in one HARQ-ACK codebook; determining, according to an order of indexes of serving cells to which the multiple PDSCHs belong, an order of values assigned to DAI counter fields in the multiple PDCCHs corresponding to the multiple PDSCHs; for PDCCHs that schedule PDSCHs in a same serving cell, determining, according to an order of indexes of search spaces to which the PDCCHs belong, an order of values assigned to DAI counter fields in the PDCCHs that schedule the PDSCHs in the same serving cell; for PDCCHs that schedule PDSCHs in a same serving cell and correspond to a same search space index, determining, according to an order of indexes of CORESETs to which the PDCCHs belong, an order of values assigned to DAI counter fields in the PDCCHs that schedule the PDSCHs in the same serving cell and correspond to the same search space index; for PDCCHs that schedule PDSCHs in a same serving cell and correspond to a same search space index and correspond to a same CORESET index, determining, according to an order of indexes of minimum CCEs to which the PDCCHs belong, an order of values assigned to DAI counter fields in the PDCCHs that schedule the PDSCHs in the same serving cell, correspond to the same search space index and correspond to the same CORESET index. In the above operations of determining an order of values assigned to DAI counter fields in the PDCCHs, if the order of values assigned to the DAI counter fields in the PDCCHs can be determined after execution of a current operation of determining the value order, the subsequent one or more operations are not needed to be executed.

Figure 7:
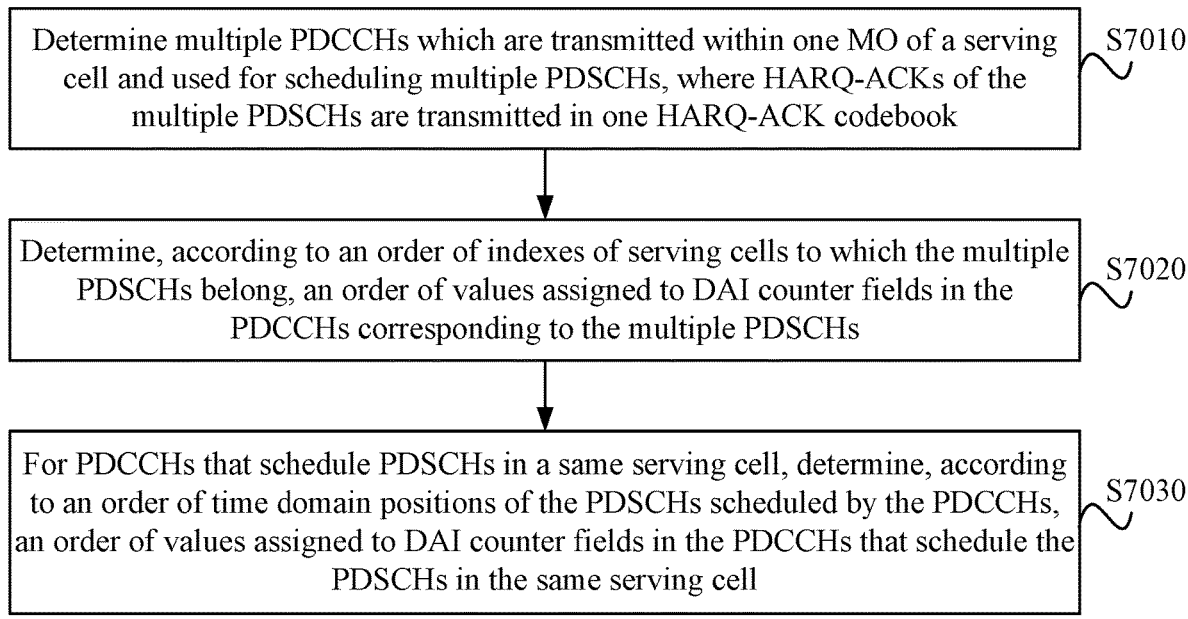
FIG. 7 is a flowchart of another information counting method according to an embodiment.

FIG. 7 is a flowchart of another information counting method according to an embodiment. As shown in FIG. 7, the method according to this embodiment includes:

determining (S7010) multiple PDCCHs which are transmitted within one MO of a serving cell and used for scheduling multiple PDSCHs, where HARQ-ACKs of the multiple PDSCHs are transmitted in one HARQ-ACK codebook;

determining (S7020), according to an order of indexes of serving cells to which the multiple PDSCHs belong, an order of values assigned to DAI counter fields in the PDCCHs corresponding to the multiple PDSCHs; and for PDCCHs that schedule PDSCHs in a same serving cell, determining (S7030), according to an order of time domain positions of the PDSCHs scheduled by the PDCCHs, an order of values assigned to DAI counter fields in the PDCCHs that schedule the PDSCHs in the same serving cell.

In an embodiment shown in FIG. 2, when multiple PDCCHs which are used for scheduling multiple PDSCHs and transmitted in one MO of a serving cell are determined, and HARQ-ACKs of the multiple PDSCHs being transmitted in one HARQ-ACK codebook, if multiple PDCCHs for scheduling PDSCHs in a same serving cell are included within the MO, it may further determine an order of values assigned to DAI counter fields in the PDCCHs for scheduling the PDSCHs in the same serving cell according to an order of time domain positions of the PDSCHs scheduled by the PDCCHs. For example, an order of values assigned to the DAI counter fields in the PDCCHs scheduling the PDSCHs in the same serving cell may be determined according to an ascending order of the time domain positions of the PDSCHs scheduled by the PDCCHs, and an order of values assigned to the DAI counter fields in the PDCCHs scheduling the PDSCHs in the same serving cell may also be determined according to a descending order of the time domain positions of the PDSCHs scheduled by the PDCCHs. The time domain positions of the PDSCHs scheduled by the PDCCHs may be determined according to start positions of the PDSCHs in the time domain or end positions of the PDSCHs in the time domain.

PDSCHs in one serving cell are generally in sequence in time domain, however, in some extreme cases, PDSCHs in a same serving cell may have a same start position and a same end position in time domain, in this way, the process may be carried out in any of the following ways.

For PDCCHs that schedule PDSCHs in a same serving cell and the PDSCHs having a same time domain position, an order of values assigned to DAI counter fields in the PDCCHs that schedule the PDSCHs in the same serving cell and the PDSCHs having the same time domain position is determined according to an order of indexes of CORESETs to which the PDCCHs belong.

In other embodiments, for PDCCHs that schedule PDSCHs in a same serving cell and the PDSCHs having a same time domain position, an order of values assigned to DAI counter fields in the PDCCHs that schedule the PDSCHs in the same serving cell and the PDSCHs having the same time domain position is determined according to an order of indexes of search spaces to which the PDCCHs belong.

In other embodiments, for PDCCHs that schedule PDSCHs in a same serving cell and the PDSCHs having a same time domain position, an order of values assigned to DAI counter fields in the PDCCHs that schedule the PDSCHs in the same serving cell and the PDSCHs having the same time domain position is determined according to an order of indexes of minimum CCEs to which the PDCCHs belong.

That is, for PDCCHs that schedule PDSCHs in a same serving cell and the PDSCHs having a same time domain position, an order of values assigned to DAI counter fields in the PDCCHs that schedule the PDSCHs in the same serving cell and the PDSCHs having the same time domain position can be further respectively determined according to an order of indexes of CORSETs to which the PDCCHs belong, an order of indexes of the search spaces to which the PDCCHs belong, and an order of indexes of minimum CCEs to which the PDCCHs belong. If an order of values assigned to DAI counter fields in the PDCCHs that schedule PDSCHs in a same serving cell and the PDSCHs having a same time domain position cannot be determined through any one of the above three ways, the order of values assigned to the DAI counter fields in the PDCCHs that schedule the PDSCHs in the same serving cell and the PDSCHs having the same time domain position may further be determined by performing any two ways or all of the above three ways.

Figure 8:
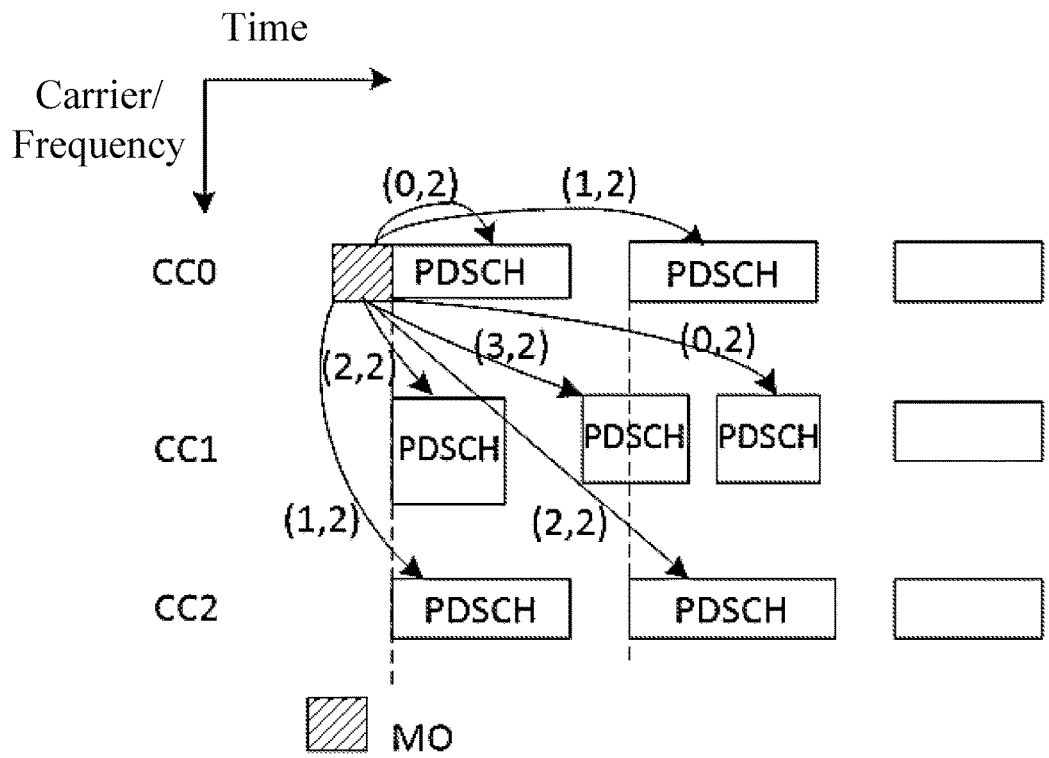
FIG. 8 is a schematic diagram of another information counting scenario according to an embodiment.

The information counting method shown in FIG. 7 is described hereinafter with an embodiment. FIG. 8 is a schematic diagram of another information counting scenario according to an embodiment. Similarly to FIG. 1, three carriers (respectively denoted as CC0, CC1 and CC2, where the carrier is an equivalent concept to a cell and a serving cell) are configured and activated for the user equipment (UE), and multiple PDCCHs are transmitted within one MO of the CC0, for scheduling PDSCHs in the CC0, CC1 and CC2 respectively. Specifically, in the CC0, two PDSCHs are scheduled; in the CC1, three PDSCHs are scheduled; and in the CC2, two PDSCHs are scheduled. In addition, HARQ-ACK information corresponding to these PDSCHs alone, or as well as HARQ-ACK information corresponding to PDSCHs scheduled by PDCCHs within other Mos, are indicated to be transmitted in one HARQ-ACK codebook. In FIG. 8, the CC0, CC1 and CC2 may have same SCSs or different SCSs, and the PDSCHs scheduled within this MO in these CCs may be in one slot or in different slots, which is not limited herein. In this case, the value assignment to DAI counter fields in these PDCCHs can be processed in the following manner, that is, when multiple PDCCHs are transmitted within one MO to respectively schedule one or more PDSCHs in one or more CCs, the value assignment to the DAI counter fields in the PDCCHs within this MO is processed as follows.

In a case where the order of values assigned to DAI counter fields in the PDCCHs within this MO is determined according to an ascending (or descending) order of indexes of CCs to which the scheduled PDSCHs belong, at first, the DAI counters in the PDCCHs corresponding to the scheduled two PDSCHs in the CC0 are assigned with values first. Since the number of the DAI counters is more than one, according to an ascending order of time domain positions of the two PDSCHs, the DAI counter in the PDCCH corresponding to a first PDSCH in the CC0 is assigned with value 0 (assuming that it is numbered from 0), and the DAI counter in the PDCCH corresponding to a second PDSCH is assigned with value 1. Then, the DAI counters in the PDCCHs corresponding to the three scheduled PDSCHs in the CC1 are assigned with values. Since the number of the DAI counters is more than one, according to an ascending order of time domain positions of the three PDSCHs, the DAI counter in the PDCCH corresponding to a first PDSCH is assigned with value 2, the DAI counter in the PDCCH corresponding to a second PDSCH is assigned with value 3, and the DAI counter in the PDCCH corresponding to a third PDSCH is assigned with value 0 (as it is circulated by mod 4, it is actually a fifth DAI counter assigned with value 0, rather than a first DAI counter assigned with value 0). Then, the DAI counters in the PDCCHs corresponding to the two scheduled PDSCHs in the CC2 are assigned with values.

Since the number of the DAI counters is more than one, according to an ascending order of time domain positions of the two PDSCHs, the DAI counter in the PDCCH corresponding to a first PDSCH is assigned with value 1, and the DAI counter in the PDCCH corresponding to a second PDSCH is assigned with value 2. Thus, the finally obtained DAI counter values are as shown in FIG. 8, specifically, for example, a first bit in (0, 2) represents a DAI counter, a second bit in (0, 2) represents a DAI total (i.e. the total number of DAIS), the first bit and the second bit each is counted from 0, i.e. 0 represents the first one, and others likewise. Herein, values assigned to either the DAI total or the DAI counter are from 0 to 3 in turn and in circulation, e.g. 0, 1, 2, 3, 0, 1, 2, 3, 0 . . . . The value assignment order of DAI counter shown in FIG. 8 is in turn as: the first PDSCH in CC0, the second PDSCH in CC0, the first PDSCH in CC1, the second PDSCH in CC1, the third PDSCH in CC1, the first PDSCH in CC2, and the second PDSCH in CC2.

The information counting method in an embodiment shown in FIG. 2 to FIG. 7 shows how to determine an order of values assigned to DAI counter fields in multiple PDCCHs corresponding to multiple PDSCHs only in the case where the PDCCHs for scheduling the multiple PDSCHs are transmitted within one MO in one serving cell. If in cases where the PDCCHs used for scheduling multiple PDSCHs are transmitted within multiple MOs in one or more serving cells, among the multiple Mos, an order of values assigned to DAI counter fields in the PDCCHs transmitted within each of the multiple MOs may be determined according to a frequency domain first and then according to a time domain, or the order of values assigned to the DAI counter fields in the PDCCHs transmitted within the multiple MOs may be determined according to a time domain manner first and then a frequency domain manner between the multiple MOs.

In an embodiment, if PDCCHs which corresponds to PDSCHs corresponding to a HARQ-ACK codebook, belongs to at least one MO, after an order of values assigned to DAI counter fields in the PDCCHs is determined according to any embodiment in FIG. 2 to FIG. 7, a last PDCCH within a last MO corresponding to the HARQ-ACK codebook may further be determined according to the order of values assigned to the DAI counter fields in the multiple PDCCHs corresponding to the multiple PDSCHs scheduled within one MO; and physical uplink control channel (PUCCH) resources transmitted in the HARQ-ACK codebook may be further determined according to parameters in the last PDCCH.

That is, in a case where multiple PDCCHs are transmitted within one MO and HARQ-ACKs corresponding to PDSCHs scheduled by the PDCCHs are indicated to be transmitted in one HARQ-ACK codebook, the DAI counters in each PDCCH are assigned with values. Herein, the DAI counters are assigned with values actually in a sequence, that is, value assignment for the DAI counters in all the PDCCHs are performed according to the sequence. In a rule for value assignment to DAI counters defined in the embodiments shown in FIG. 2 to FIG. 7, it can be found which PDCCH is the last one, that is, the DAI counter in the last PDCCH is the last one to be assigned with value. Therefore, it is applicable to determining which PDCCH in the PDCCHs corresponding to a HARQ-ACK codebook (that is, the PDCCHs corresponding to the PDSCHs corresponding to the HARQ-ACK codebook) is the last PDCCH. Generally, only one PDCCH is transmitted within one MO, therefore, the last PDCCH in PDCCHs corresponding to one HARQ-ACK codebook can be determined simply according to the time sequence of MOs, that is, in the MOs corresponding to the PDCCHs corresponding to PDSCHs corresponding to one HARQ-ACK codebook, the PDCCH within the last MO is the last PDCCH. However, if multiple PDCCHs are transmitted within one MO, and HARQ-ACKs of PDSCHs scheduled by the multiple PDCCHs are transmitted in one HARQ-ACK codebook, then the last PDCCH needs to be determined by the solutions in the embodiments as shown in FIG. 2 to FIG. 7. That is, the last MO is determined first, and then the last PDCCH within the last MO is determined according to the solutions provided in the embodiments as shown in FIG. 2 to FIG. 7. The PUCCH resources transmitted in the HARQ-ACK codebook is thus determined by using relevant parameters in the last PDCCH.

An embodiment is further provided according to the present application as follows.

Figure 9:
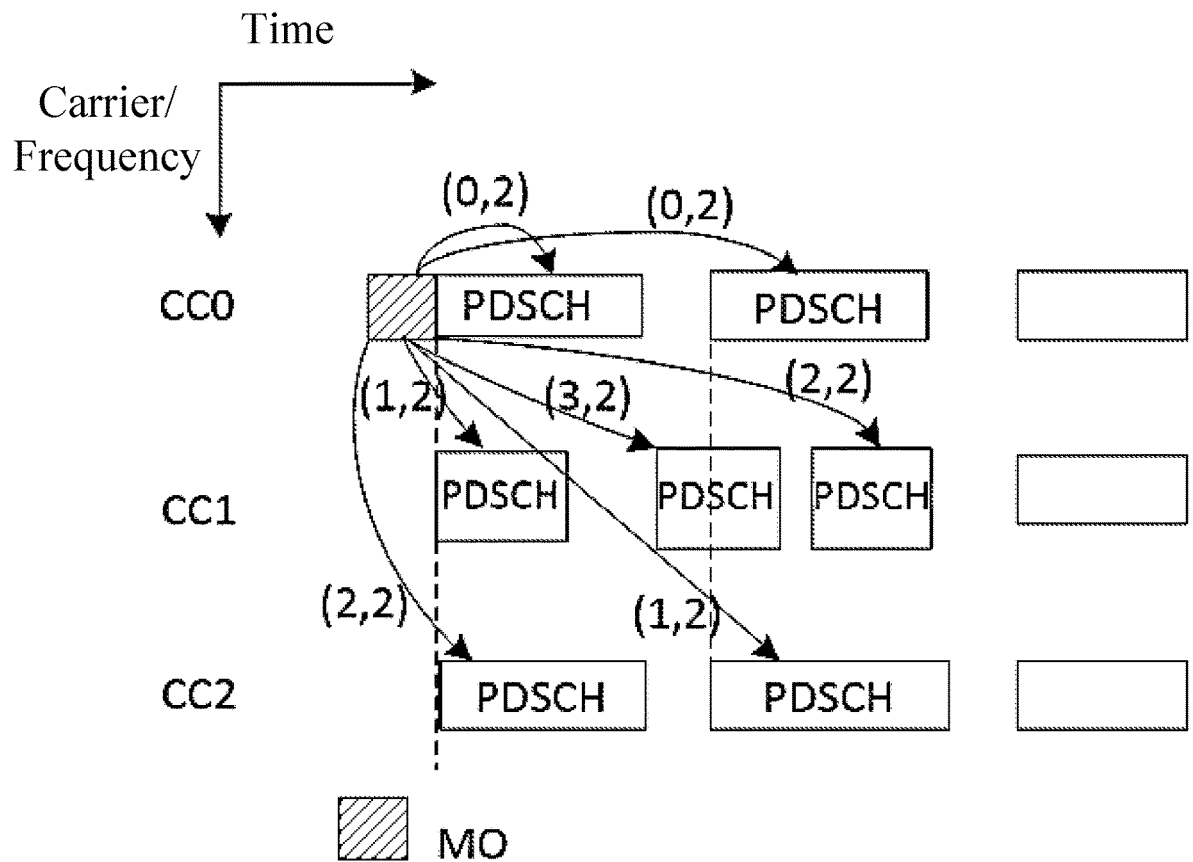
FIG. 9 is a schematic diagram of another information counting scenario according to an embodiment.

For multiple PDCCHs transmitted within one MO to schedule PDSCHs respectively, and HARQ-ACKs corresponding to these PDSCHs being indicated to be transmitted in one HARQ-ACK codebook, values of DAI counters in the PDCCHs may be set according to the following conditions such as: according to an ascending order of time domain positions of the PDSCHs (refers to according to an order of start positions or an order of end positions of the PDSCHs from earlier to later in time, similar principle thereof is also applicable for a descending order, as long as it is negotiated); for PDSCHs with a same time domain position (if any), further according to an ascending (or a descending) order of indexes of CCs to which the PDSCHs belong; for PDSCHs with a same time domain position and belonging to a same CC (if any), further according to an ascending (or descending) order of frequency domain start positions of these PDSCHs or according to frequency domain end positions of these PDSCHs, and in other embodiments, in this case, further according to an ascending (or descending) order of indexes of CORSETs to which the PDCCHs corresponding to these PDSCHs belong, an ascending (or descending) order of indexes of search spaces to which the PDCCHs corresponding to these PDSCHs belong, or, an ascending (or descending) order of indexes of minimum CCEs to which the PDCCHs corresponding to these PDSCHs belong as mentioned in the embodiments shown in FIG. 2 to FIG. 7. For example, FIG. 9 is a schematic diagram of another information counting scenario according to an embodiment, and FIG. 9 shows the values of DAI counters according to the rule in this embodiment. Here, it is assumed that a start symbol of the PDSCHs is used as a reference for ascending order of time domain positions of the PDSCHs. The value assignment order of the DAI counters shown in FIG. 9 is as: a first PDSCH in CC0, a first PDSCH in CC1, a first PDSCH in CC2, a second PDSCH in CC1, a second PDSCH in CC0, a second PDSCH in CC2, and a third PDSCH in CC1.

One embodiment is further provided according to the present application as follows.

In the related art, for a terminal (including UE), if multiple uplink physical channels of the terminal overlap in time domain, the multiple uplink physical channels are multiplexed into a new uplink physical channel after meeting a required timing sequence, and the new uplink physical channel may be one of the multiple uplink physical channels. The new uplink physical channel will carry uplink control information (UCI) in the multiple uplink physical channels, but an end position of the new uplink physical channel may be later than an end position of a channel A in the multiple uplink physical channels. In this way, when the data in the channel A is transmitted through the new uplink physical channel, a time delay is caused. However, in the related art, the ultra-reliable and low-latency communications (URLLC) service is not supported, so that the time delay caused by the new uplink physical channel (for example, relative to the channel A) can be ignored. However, when the URLLC service is introduced, if the channel A carries a URLLC-related channel (for example, a HARQ-ACK PUCCH, a scheduling request (SR) PUCCH, a channel state information (CSI) PUCCH, or an uplink data PUSCH), the time delay caused by the new uplink physical channel may be fatal in this case, and the problem needs to be addressed.

In the technology under discussion, for a UE, when multiple uplink physical channels of the UE overlap in time domain, the multiple uplink physical channels are allowed to be multiplexed in a new uplink physical channel if the following conditions are met: an end symbol of the new uplink physical channel is not later than X symbols after the URLLC-related channel in the multiple uplink physical channels. However, how can X symbols be determined (when multiple subcarrier spacings exist) to minimize the adverse effect on URLLC and support multiplexing of multiple uplink physical channels to the maximum extent? a method A and a method B are provided.

Method A

The base station and the UE negotiate to determine the value of X according to a minimum (or maximum) SCS in the SCSs of the multiple uplink physical channels. In other embodiments, the base station and the UE negotiate to determine the value of X according to the SCS of the new uplink physical channel. In other embodiments, the base station and the UE negotiate to determine the value of X according to a minimum (or maximum) SCS in the SCSs of the URLLC-related channels in the multiple uplink physical channels.

For example, for cases with different subcarrier spacings, corresponding values of X are configured, and the final value of X may be determined according to the above manners.

The values of X corresponding to different subcarrier spacings are negotiated as follows.

X is 1 or 0, when SCS is 15 KHz; X is 2, 1 or 0, when SCS is 30 KHz; X is 4, 2, 1 or 0, when SCS is 60 KHz; X is 8, 4, 2, 1 or 0, when SCS is 120 KHz; or, X is 16, 8, 4, 2, 1 or 0, when SCS is 240 KHz. In addition, X is allowed to be less than 0 for all SCS values.

In other embodiments, the base station may configure a value of X for the UE, for example, the value of X is configured by a radio resource control (RRC) or a media access control address control element (MAC CE). The UE always uses the configured value of X. If the base station does not configure the value of X, it is defaulted that X is 0.

Method B

The base station configures the value of X as n for the UE or the base station and the UE negotiate that the value of X is n. The base station and the UE negotiate as follows.

According to a parameter u corresponding to the subcarrier spacing of the new uplink physical channel; or, according to a minimum parameter (or a maximum) u in parameters u corresponding to subcarrier spacings of URLLC-related channels in the multiple uplink physical channels, the final value of X (represented as X1) is determined, such as $X1=n*2u$.

The value of the parameter u is as follows. 15 KHz SCS corresponding to u=0; 30 KHz SCS corresponding to u=1; 60 KHz SCS corresponding to u=2; 120 KHz SCS corresponding to u=3; and 240 KHz SCS corresponds to u=4.

Figure 10:
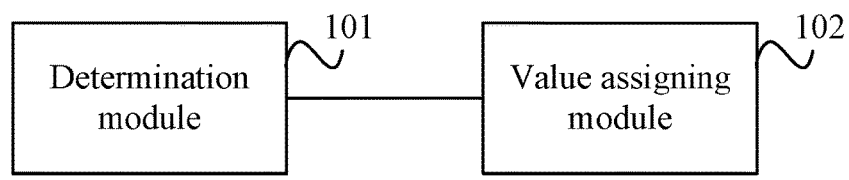
FIG. 10 is a schematic structural diagram of an information counting apparatus according to an embodiment.

FIG. 10 is a schematic structural diagram of an information counting apparatus according to an embodiment. As shown in FIG. 10, the information counting apparatus according to this embodiment includes a determination module 101 configured to determine multiple PDCCHs which are transmitted within one MO of a serving cell and used for scheduling multiple PDSCHs, where HARQ-ACKs of the multiple PDSCHs are transmitted in one HARQ-ACK codebook; and a value assigning module 102 configured to determine, according to an order of indexes of serving cells to which the multiple PDSCHs belong, an order of values assigned to DAI counter fields in the multiple PDCCHs corresponding to the multiple PDSCHs.

The information counting apparatus according to the embodiment is configured to implement the information counting method according to the embodiment as shown in FIG. 2. The information counting apparatus according to this embodiment has implementation principles and technical effects similar to those of the method, and details of which will not be repeated herein.

Figure 11:
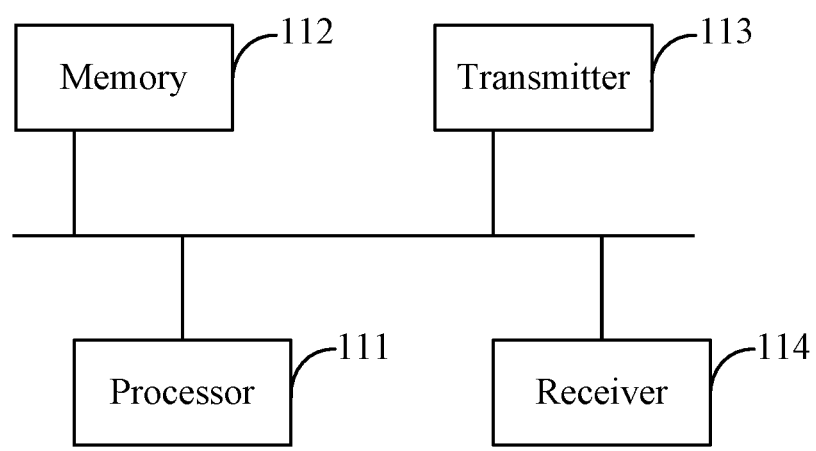
FIG. 11 is a schematic structural diagram of a base station according to an embodiment.

FIG. 11 is a schematic structural diagram of a base station according to an embodiment. As shown in FIG. 11, the base station includes a processor 111, a memory 112, a transmitter 113, and a receiver 114. The number of processors 111 in the base station may be one or more, and one processor 111 is taken as an example in FIG. 11. The processor 111, the memory 112, the transmitter 113 and the receiver 114 in the base station can be connected through a bus or other means. The processor 111, the memory 112, the transmitter 113 and the receiver 114 in the base station connected by a bus in FIG. 11 is taken as an example.

As a non-transitory computer-readable storage medium, the memory 112 may be configured to store a software program, a computer-executable program and a module, as the program instructions/modules corresponding to the information counting method in the embodiments shown in FIG. 2 to FIG. 7 (e.g., the determination module 101 and the value assigning module 102 in the information counting apparatus). The processor 111 executes software programs, instructions, and modules stored in the memory 112, to implement at least one functional application and data processing, that is, to implement the information counting method shown in FIG. 2 to FIG. 7.

The memory 112 may mainly include a program storage area and a data storage area, where the program storage area may store an operating system and an application program required for at least one function; and the data storage area may store data created in use of the terminal, etc. Further, the memory 112 may include a high-speed random access memory, and may further include a non-volatile memory, such as at least one magnetic disk storage apparatus, a flash memory device, or other non-volatile solid-state storage apparatus.

The transmitter 113 is a combination of modules or devices which is capable of transmitting RF signals into air, such as a combination of a RF transmitter, an antenna, and other devices. The receiver 114 is a combination of modules or devices which is capable of receiving RF signals from air, such as a combination of a RF receiver, an antenna, and other devices.

Embodiments of the present application further provide a storage medium including computer-executable instructions. The computer-executable instructions, when executed by a computer processor, is configured to perform an information counting method. The information counting method includes: determining multiple PDCCHs which are used for scheduling multiple PDSCHs and are transmitted within one MO of a serving cell, where HARQ-ACKs of the multiple PDSCHs are transmitted in one HARQ-ACK codebook; and determining, according to an order of indexes of the serving cells to which the multiple PDSCHs belong, an order of values assigned to DAI counter fields in the multiple PDCCHs corresponding to the multiple PDSCHs.

The term "user terminal" encompasses any appropriate type of radio user equipment, such as a mobile phone, a portable data processing apparatus, a portable web browser, or a vehicle-mounted mobile station.

In general, the various embodiments of the present application may be implemented in hardware, a dedicated circuit, software, logic, or any combination thereof. For example, some aspects may be implemented in hardware while other aspects may be implemented in firmware or software that may be executed by a controller, a microprocessor, or other firmware or software executed by other computing apparatuses, although it is not limited thereto in the present application.

Embodiments of the present application may be implemented by a data processor of a mobile apparatus executing computer program instructions, for example, may be implemented in a processor entity, or implemented by hardware, or a combination of software and hardware. The computer program instructions may be assembly instructions, instruction set architecture (ISA) instructions, machine instructions, machine-related instructions, micro-codes, firmware instructions, state setting data, or source codes or object codes written in one programming language or in any combination of multiple programming languages.

The block diagrams of any logic flows in drawings of the present application may represent program steps, or may represent interconnected logic circuits, modules, and functions, or may represent a combination of program steps, logic circuits, modules, and functions. The computer program may be stored in a memory. The memory may be any type suitable for a local technical environment and may be implemented through any suitable data storage technology, such as, but not limited to, a read-only memory (ROM), a random-access memory (RAM) and an optical memory apparatus and system (digital video disc (DVD) or compact disc (CD)). The computer-readable storage medium may include a non-transitory storage medium. The data processor may be any type appropriate for the local technical environment such as, but not limited to, a general-purpose computer, a special purpose computer, a microprocessor, a digital signal processor (DSP), an application specific integrated circuit (ASIC), a field-programmable gate array (FPGA), and a processor based on a multi-core processor architecture.

What is claimed is:

1. A method, comprising:
determining a plurality of physical downlink control channels (PDCCHs) which are transmitted within one monitoring occasion (MO) of a serving cell and used for scheduling a plurality of physical downlink shared channels (PDSCHs), wherein hybrid automatic repeat request acknowledgements (HARQ-ACKs) of the plurality of PDSCHs are in one HARQ-ACK codebook;
determining, according to an order of indices of serving cells to which the plurality of PDSCHs belong, values assigned to counter downlink assignment indicator (DAI counter) fields in the plurality of PDCCHs corresponding to the plurality of PDSCHs;
for PDCCHs that schedule PDSCHs in a same serving cell, determining, according to an order of time domain positions of the PDSCHs scheduled by the PDCCHs, the values assigned to DAI counter fields in the PDCCHs that schedule PDSCHs in a same serving cell; and
for PDCCHs that schedule PDSCHs in the same serving cell and with a same time domain position, determining, according to an order of indices of control resource sets (CORESETs) to which the PDCCHs belong, the values assigned to DAI counter fields in the PDCCHs that schedule the PDSCHs in the same serving cell and with the same time domain position.

2. The method of claim 1, wherein determining, according to the order of time domain positions of the PDSCHs scheduled by the PDCCHs, the values assigned to the DAI counter fields in the PDCCHs that schedule the PDSCHs in the same serving cell, comprises:
determining, according to an ascending order of the time domain positions of the PDSCHs scheduled by the PDCCHs.

3. An apparatus, comprising:
at least one processor configured to:
determine a plurality of physical downlink control channels (PDCCHs) which are transmitted within one monitoring occasion (MO) of a serving cell and used for scheduling a plurality of physical downlink shared channels (PDSCHs), wherein hybrid automatic repeat request acknowledgements (HARQ-ACKs) of the plurality of PDSCHs are in one HARQ-ACK codebook;
determine, according to an order of indices of serving cells to which the plurality of PDSCHs belong, values assigned to counter downlink assignment indicator (DAI counter) fields in the plurality of PDCCHs corresponding to the plurality of PDSCHs;
for PDCCHs that schedule PDSCHs in a same serving cell, determine, according to an order of time domain positions of the PDSCHs scheduled by the PDCCHs, the values assigned to DAI counter fields in the PDCCHs that schedule PDSCHs in the same serving cell; and
for PDCCHs that schedule PDSCHs in the same serving cell and with a same time domain position, determine, according to an order of indices of control resource sets (CORESETs) to which the PDCCHs belong, the values assigned to DAI counter fields in the PDCCHs that schedule the PDSCHs in the same serving cell and with the same time domain position.

4. The apparatus of claim 3, wherein determining, according to the order of time domain positions of the PDSCHs scheduled by the PDCCHs, the values assigned to the DAI counter fields in the PDCCHs that schedule the PDSCHs in the same serving cell, comprises:
determining, according to an ascending order of the time domain positions of the PDSCHs scheduled by the PDCCHs.

5. A method, comprising:
transmitting, by a terminal, hybrid automatic repeat request acknowledgements (HARQ-ACKs) of a plurality of physical downlink shared channels (PDSCHs) in one HARQ-ACK codebook,
wherein a plurality of physical downlink control channels (PDCCHs) are transmitted within one monitoring occasion (MO) of a serving cell and used for scheduling the plurality of PDSCHs,
wherein values assigned to counter downlink assignment indicator (DAI counter) fields in the plurality of PDCCHs corresponding to the plurality of PDSCHs, are determined according to an order of indexes of serving cells to which the plurality of PDSCHs belong, wherein for PDCCHs that schedule PDSCHs in a same serving cell, values assigned to DAI counter fields in the PDCCHs that schedule PDSCHs in the same serving cell are determined according to an order of time domain positions of the PDSCHs scheduled by the PDCCHs, and wherein for PDCCHs that schedule PDSCHs in the same serving cell and with a same time domain position, values assigned to the DAI counter fields in the PDCCHs that schedule PDSCHs in the same serving cell and with the same time domain position are determined according to an order of indices of control resource sets (CORESETs) to which the PDCCHs belong.

6. The method of claim 5, wherein the values assigned to the DAI counter fields, in the PDCCHs that schedule the PDSCHs in the same serving cell, are determined according to an ascending order of the time domain positions of the PDSCHs scheduled by the PDCCHs.

7. A terminal, comprising:
at least one processor configured to:
transmit, via a transmitter, hybrid automatic repeat request acknowledgements (HARQ-ACKs) of a plurality of physical downlink shared channels (PDSCHs) in one HARQ-ACK codebook,
wherein a plurality of physical downlink control channels (PDCCHs) are transmitted within one monitoring occasion (MO) of a serving cell and used for scheduling the plurality of PDSCHs,
wherein values assigned to counter downlink assignment indicator (DAI counter) fields in the plurality of PDCCHs corresponding to the plurality of PDSCHs, are determined according to an order of indexes of serving cells to which the plurality of PDSCHs belong, wherein for PDCCHs that schedule PDSCHs in a same serving cell, values assigned to DAI counter fields in the PDCCHs that schedule PDSCHs in the same serving cell are determined according to an order of time domain positions of the PDSCHs scheduled by the PDCCHs, for PDCCHs that schedule PDSCHs in a same serving cell, and wherein for PDCCHs that schedule PDSCHs in the same serving cell and with a same time domain position, values assigned to the DAI counter fields in the PDCCHs that schedule PDSCHs in the same serving cell and with the same time domain position are determined according to an order of indices of control resource sets (CORESETs) to which the PDCCHs belong.

8. The terminal of claim 7, wherein the values assigned to the DAI counter fields, in the PDCCHs that schedule the PDSCHs in the same serving cell, are determined according to an ascending order of the time domain positions of the PDSCHs scheduled by the PDCCHs.

9. A non-transitory computer-readable storage medium storing a computer program, wherein the computer program, when executed by at least one processor, causes the at least one processor to implement the method of claim 1.

10. A non-transitory computer-readable storage medium storing a computer program, wherein the computer program, when executed by at least one processor, causes the at least one processor to implement the method of claim 2.

11. A non-transitory computer-readable storage medium storing a computer program, wherein the computer program, when executed by at least one processor, causes the at least one processor to implement the method of claim 5.

12. A non-transitory computer-readable storage medium storing a computer program, wherein the computer program, when executed by at least one processor, causes the at least one processor to implement the method of claim 6.

* * * * *